(12) United States Patent
Park et al.

(10) Patent No.: US 7,923,099 B2
(45) Date of Patent: Apr. 12, 2011

(54) COMPOSITION FOR ACRYLIC ARTIFICIAL STONE

(75) Inventors: Eung Seo Park, Yeous-si (KR); Do Choon Rha, Seoul (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 237 days.

(21) Appl. No.: 12/007,643

(22) Filed: Jan. 14, 2008

(65) Prior Publication Data

US 2008/0113124 A1   May 15, 2008

Related U.S. Application Data

(63) Continuation of application No. PCT/KR2006/002433, filed on Jun. 23, 2006.

(30) Foreign Application Priority Data

Jul. 15, 2005   (KR) .................. 10-2005-0064243

(51) Int. Cl.
*B32B 7/02*    (2006.01)
*B32B 27/32*   (2006.01)

(52) U.S. Cl. .......... 428/212; 428/15; 428/220; 523/171; 523/201

(58) Field of Classification Search ............... 428/15, 428/212, 220; 523/171, 201
See application file for complete search history.

(56) References Cited

U.S. PATENT DOCUMENTS 6,323,259 B1 *  11/2001  Ikegami et al. ............ 523/171

FOREIGN PATENT DOCUMENTS

| | | |
|---|---|---|
| JP | 2000-317957 | 11/2000 |
| KR | 10-2000-0030165 A | 6/2000 |
| KR | 10-2003-0094532 A | 12/2003 |
| KR | 10-2006-0064835 A | 6/2006 |
| WO | WO 97/01515 | 1/1997 |

* cited by examiner

*Primary Examiner* — Mark Ruthkosky
*Assistant Examiner* — Lawrence D Ferguson
(74) *Attorney, Agent, or Firm* — Lee & Morse, P.C.

(57) ABSTRACT

An acrylic artificial stone composition includes an acrylic resin, metallized polymer film particles, and an inorganic filler.

21 Claims, 2 Drawing Sheets

COMPOSITION FOR ACRYLIC ARTIFICIAL STONE

CROSS-REFERENCE TO RELATED APPLICATION

This application is a continuation of PCT Application No. PCT/KR2006/002433, entitled "COMPOSITION FOR ACRYLIC ARTIFICIAL MARBLE," which was filed on Jun. 23, 2006.

BACKGROUND OF THE INVENTION

1. Field of the Invention

Embodiments relate to a composition for acrylic artificial stone, an artificial stone, and associated methods. More particularly, embodiments relate to a composition for acrylic artificial stone that may be suitable for producing artificial stone having an attractive pattern, the composition including metallized polymer film particles to enhance diffuse reflectance of an artificial stone produced using the composition.

2. Description of the Related Art

Artificial stone, e.g., artificial marble, has been widely used as a building material. Artificial stone may be classified into two types according to a resin used as a base material. One type is an acrylic artificial stone, and the other is an unsaturated polyester artificial stone. Recently, the acrylic artificial stone has become widely used for its excellent appearance, high-class texture and good durability compared to unsaturated polyester artificial marble. For example, acrylic artificial stone may be used as a material for articles such as kitchen countertops, wash bowls, dressing tables, bathtubs, various table surfaces, wall materials, interior articles, slabs, solids of various shapes, etc.

Generally, manufacturers of artificial stones have been focused on realizing a natural stone-like appearance and texture. However, there is a need for artificial stone having various patterns and designs as the application of artificial marble diversifies and expands.

SUMMARY OF THE INVENTION

Embodiments are therefore directed to a composition for acrylic artificial stone, an artificial stone, and associated methods, which substantially overcome one or more of the problems due to the limitations and disadvantages of the related art.

It is therefore a feature of an embodiment to provide a composition for artificial stone that includes metallized polymer film particles, and a method of preparing the same.

It is therefore another feature of an embodiment to provide an artificial stone article including metallized polymer film particles embedded in a polymeric matrix, and a method of preparing the same.

At least one of the above and other features and advantages may be realized by providing an acrylic artificial stone composition, including an acrylic resin, metallized polymer film particles, and an inorganic filler.

The composition may include about 0.1 to 5 parts by weight of the metallized polymer film particles, based on 100 parts by weight of the acrylic resin, and about 100 to 200 parts by weight of the inorganic filler, based on 100 parts by weight of the acrylic resin.

The metallized polymer film particles may include one or more metal layers on a surface of a polymer film. The metallized polymer film particles may have a particle size of about 0.001 to about 2.5 mm. A thickness of the polymer film may be about 30 μm to about 100 μm. A total thickness of the one or more metal layers may be about 1 μm to about 10 μm.

The acrylic resin may include a weight fraction of greater than or equal to about 65% of one or more acrylic acid compounds, and a weight fraction of less than or equal to about 35% of one or more polyacrylates. The one or more acrylic acid compounds may include one or more of methacrylic acid, methyl methacrylate, ethyl methacrylate, isopropyl methacrylate, n-butyl methacrylate and/or 2-ethylhexyl methacrylate. The acrylic artificial stone composition may further include artificial and/or genuine stone chips having a particle size of about 0.1 mm to about 5 mm.

At least one of the above and other features and advantages may also be realized by providing an acrylic artificial stone article, including a polymeric acrylic matrix, metallized polymer film particles embedded in the polymeric acrylic matrix, and an inorganic filler embedded in the polymeric acrylic matrix.

The article may include about 0.1 to 5 parts by weight of the metallized polymer film particles, based on 100 parts by weight of the polymeric acrylic matrix, and about 100 to 200 parts by weight of the inorganic filler, based on 100 parts by weight of the polymeric acrylic matrix.

The metallized polymer film particles may include one or more metal layers on a surface of a polymer film. The metallized polymer film particles may have a particle size of about 0.001 to about 2.5 mm. A thickness of the polymer film may be about 30 μm to about 100 μm. A total thickness of the one or more metal layers may be about 1 μm to about 10 μm.

The polymeric acrylic matrix may include a weight fraction of greater than or equal to about 65% of one or more acrylic acid compounds, and a weight fraction of less than or equal to about 35% of one or more polyacrylates. The one or more acrylic acid compounds may include one or more of methacrylic acid, methyl methacrylate, ethyl methacrylate, isopropyl methacrylate, n-butyl methacrylate and/or 2-ethylhexyl methacrylate. The acrylic artificial stone article may further include artificial and/or genuine stone chips having a particle size of about 0.1 mm to about 5 mm.

At least one of the above and other features and advantages may also be realized by providing a method of preparing an artificial stone, including providing an acrylic resin, metallized polymer film particles, and an inorganic filler; and combining the acrylic resin, metallized polymer film particles, and the inorganic filler to form a composition.

The method of preparing an artificial stone may further include forming the composition into a predetermined shape, and curing the composition to form a solid surface article.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
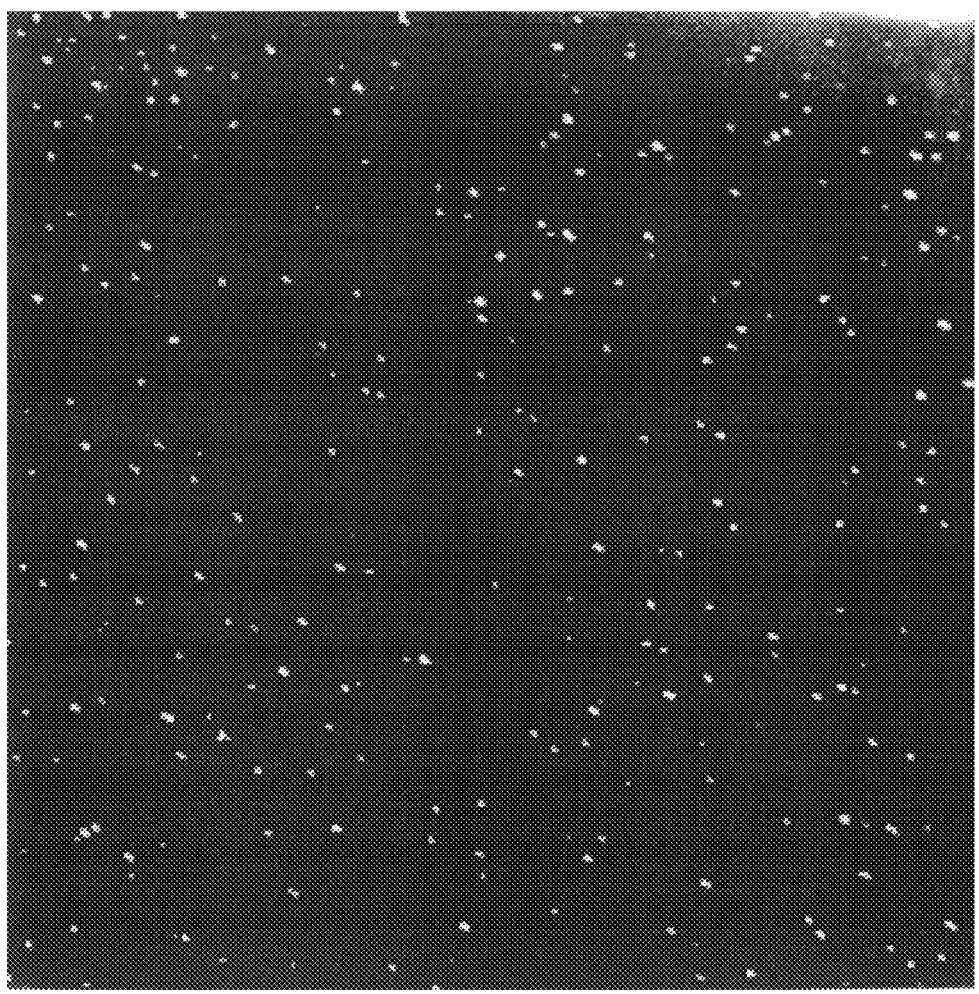
FIG. 1 illustrates a surface pattern of an Example of an artificial stone article that contains metallized polymer film particles according to an embodiment.

Korean Patent Application No. 10-2005-0065243, filed on Jul. 15, 2005, in the Korean Intellectual Property Office, and entitled: "Composition for Acrylic Artificial Marble," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include a fourth member, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B and, C together, whereas the expression "either A, B, or C" means one of A alone, B alone, and C alone, and does not mean any of both A and B together; both A and C together; both B and C together; and all three of A, B and C together.

A composition for acrylic artificial marble according to an embodiment may include an acrylic resin, metallized polymer film particles, and an inorganic filler. In an implementation, the composition may further include a polymerization initiator, and artificial and/or genuine stone chips.

Acrylic Resin

The acrylic resin in the composition according to this embodiment may include one or more (meth)acrylic acid compounds having one or more polymers thereof, i.e., one or more polyacrylates, mixed therein. Hereinafter, in the present invention, acrylic acid, methacrylic acid and esters thereof may generally be referred to as "(meth)acrylic acid compound."

The (meth)acrylic acid compounds may include monomers such as, e.g., methacrylic acid, methyl methacrylate, ethyl methacrylate, isopropyl methacrylate, n-butyl methacrylate, 2-ethylhexyl methacrylate, etc., each of which may be used alone or in combination with one or more other monomers.

The one or more polyacrylates mixed with the one or more (meth)acrylic acid compounds may include, e.g., a homopolymer or copolymer of methyl methacrylate, ethyl methacrylate, isopropyl methacrylate, n-butyl methacrylate, 2-ethyl hexyl methacrylate, etc., each of which may be individually mixed with the (meth)acrylic acid compound(s) or mixed therein in combination with one or more other polyacrylates. In an implementation, the polyacrylate may be polymethylmethacrylate (PMMA).

In an implementation, a fraction of (meth)acrylic monomer in the acrylic resin may be greater than or equal to about 65% by weight of the acrylic resin, and a fraction of polyacrylate in the acrylic resin may be less than or equal to about 35% by weight of the acrylic resin, i.e., the weight ratio of acrylic monomer to polyacrylate in the acrylic resin may be about 65 or more or about 35 or less.

Metallized Polymer Film Particles

The metallized polymer film particles in the composition according to this embodiment may provide an attractive pattern for an artificial stone, such as artificial marble. The metallized polymer film particles may be used in an amount of, e.g., about 0.1 parts by weight to about 5 parts by weight, per 100 parts by weight of the acrylic resin. Using less than or equal to about 5 parts by weight may provide an efficient diffusion effect, thereby enhancing the appearance of an artificial stone article made using the composition. Using greater than or equal to about 0.1 parts by weight may enhance reflectance of the artificial stone article.

The metallized polymer film particles may be particles of a polymer film that have deposited thereon a plurality of metal layers. Such a configuration may enhance diffuse reflectance in an artificial stone article produced from the composition, which may provide an enhanced glittering effect in the artificial stone article. The polymer film is substantially transparent. Examples of the polymer film may include polycarbonate film, polymethyl methacrylate (PMMA) film, polystyrene film, polyacrylonitrile-styrene film, acrylonitrile-butadiene-styrene (ABS) film, polyester film, unsaturated polyester film, polyolefin film, silicone resin film, PVC film, polyamide film and the like. In exemplary embodiments of the invention, the polymer film is polyester film.

The metallized polymer film particles may be produced by, e.g., depositing one or more metal layers onto a surface of a polymer film. In an implementation, once the metal layer or layers have been deposited on the polymer film, the metallized polymer film may be cut, pulverized, etc., into particles.

The particles may have a size of, e.g., about 0.001 to about 2.5 mm. In an implementation, the size may be about 0.004 mm to about 2.5 mm. Particles of this size may provide a desirable pattern. Using particles having a size less than or equal to about 2.5 mm may provide a particularly beautiful pattern in an artificial stone article produced using the composition. Using particles having a size greater than or equal to about 0.001 mm may provide a particularly noticeable reflecting effect in an artificial stone article produce using the composition. Particles of a uniform size may be used in the composition, or particles of various sizes may be used.

The thickness of the polymer film may be, e.g., about 30 μm to about 100 μm. Using a thickness of greater than or equal to about 30 μm may help reduce or eliminate deformation. Using a thickness of less than or equal to about 100 μm may help maintain flexibility.

In an implementation, the polymer film may have multiple metal layers thereon, rather than on a single metal layer. Employing multiple metal layers in this manner may enhance the glittering effect, due to one or more discontinuities between metal layers. In an implementation, in order to increase the discontinuity, a direction and/or angle of deposition of the metal on the polymer film may be varied between the layers. In an implementation, one or more metals may be used to form the layers, e.g., a metal composition may vary from metal layer to metal layer.

The number of layers of metal deposited on the polymer film may be suitably varied. The total thickness of the metal layers may be, e.g., about 1 μm to about 10 μm. In an implementation, the total thickness may be about 1 μm to about 3 μm.

As described above, according to this embodiment, the metallized polymer film particles employed in the composition may provide an attractive appearance and pattern. Further, diffuse reflectance may be maximized by glittering of the metallized polymer film particles, which may make the particles appear larger than they actually are.

In contrast, particles that are produced by merely coating or printing a polymer film with a colorant and then cutting the coated or printed film, when employed in an acrylic artificial stone, may not reflect light well. Accordingly, such particles may provide little glittering effect.

Inorganic Filler

The inorganic filler in the composition according to this embodiment may include one or more inorganic materials suitable for use as fillers in a resin-based composition. For example, the filler may include one or more of calcium carbonate, aluminum hydroxide, silica, alumina, barium sulfate, magnesium hydroxide, etc. In an implementation, aluminum hydroxide may be employed as the inorganic filler, in which case an artificial stone article produced from the composition may exhibit a transparent and elegant appearance. The inorganic filler may have a particle size of, e.g., about 1 μm to about 100 μm.

The inorganic filler may be used in an amount of, e.g., about 100 to about 200 parts by weight, per 100 parts by weight of acrylic resin. In an implementation, the inorganic filler may be used in an amount of about 120 to about 160 parts by weight. Using greater than or equal to about 100 parts by weight may provide the composition with a viscosity that enhances strength and hardness in the resulting artificial stone article. Using less than or equal to about 200 parts by weight may enhance the workability of the composition.

Polymerization Initiator

In an implementation, the composition may further include a polymerization initiator. Examples of the polymerization initiator include peroxides such as benzoyl peroxide, lauroyl peroxide, butyl hydroperoxide, cumyl hydroperoxide, etc., and azo compounds such as azobis(isobutyronitrile) and the like.

The polymerization initiator may be used in an amount of, e.g., about 0.1 to about 10 parts by weight, per 100 parts by weight of acrylic resin.

Stone Chips

In an implementation, the composition may further include artificial stone chips and/or genuine stone chips. For example, artificial stone chips having sizes of about 0.1 mm to about 5 mm may be added, such that additional patterns of artificial stone may be produced using the composition.

The artificial stone chips may be, e.g., artificial marble chips, which may be prepared by, e.g., mixing about 100 parts by weight of a second acrylic resin, about 120 to about 200 parts by weight of a second inorganic filler, about 0.1 to about 10 parts by weight of a cross linking agent, and about 0.1 to about 10 parts by weight of a second initiator, curing the mixture, and pulverizing the cured material into particles having a size of about 0.1 mm to about 5 mm. The second acrylic resin, the second inorganic filler, and the second initiator may be the same or different from those used in the composition, i.e., those described above.

The stone chips may be included in the composition in an amount of, e.g., about 100 parts by weight, per 100 parts by weight of the acrylic resin.

Artificial Stone

The above-described composition may be used to produce an artificial stone article. For example, in an implementation, the acrylic resin, metallized polymer film particles, and inorganic filler, as well as any polymerization initiator and/or stone chips, may be mixed together to form a slurry. Then the slurry may be poured into a form, molding cell, etc., and cured to form an artificial stone article such as an artificial stone kitchen countertop, wash bowl, dressing table, bathtub, table surface, wall material, interior article, slab, solid of a predetermined shape, etc.

The following Example and Comparative Example are provided in order to set forth particular details of one or more embodiments. However, it will be understood that the embodiments are not limited to the particular details described.

Example

The Example according to an embodiment was prepared by mixing 100 parts by weight of methyl methacrylate resin syrup, which was a mixture of 30% of polymethyl methacrylate and 70% of methyl methacrylate, by weight, with 0.7 parts by weight of metallized polyester film particles having a particle size of about 0.2 mm and 1 part by weight of metallized polyester film particles having a particle size of about 0.8 mm, 120 parts by weight of aluminum hydroxide, and 2 parts by weight of lauroyl peroxide to obtain a slurry mixture for artificial marble. The metallized polyester film particles were fabricated from Hologram Silver JW1401 (Hologram Silver JW1401 is manufactured by the Jangwon Industrial Co., Ltd. (Korea)). The slurry mixture was poured into a molding cell and cured to obtain a solid surface article in the form of a flat plate. FIG. 1 illustrates the appearance of the resulting article.

Comparative Example

Figure 2:
FIG. 2 illustrates a surface pattern of a Comparative Example of an artificial stone article.

The Comparative Example was prepared by mixing 100 parts by weight of methyl methacrylate resin syrup, which was a mixture of 30% of polymethyl methacrylate and 70% of methyl methacrylate, with 0.4 parts by weight of particles having a particle size of about 0.2 mm, 120 parts by weight of aluminum hydroxide, and 2 parts by weight of lauroyl peroxide to obtain a slurry mixture for artificial marble. The particles were fabricated from Silver JW101 (Silver JW101 is manufactured by the Jangwon Industrial Co. (Korea)). The slurry mixture was poured into a molding cell and cured to obtain a solid surface article in the form of a flat plate. FIG. 2 illustrates the appearance of the resulting article.

As described above, a composition for artificial stone according to an embodiment may be employed to produce an artificial stone article exhibiting a luxurious and beautiful appearance. Metallized polymer film particles in the composition may provide the artificial stone with an attractive pattern.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. An acrylic artificial stone composition, comprising:
   an acrylic resin;
   metallized polymer film particles, the metallized polymer film particles including one or more metal layers on a surface of a polymer film and having a particle size of about 0.001 to about 2.5 mm; and
   an inorganic filler.
2. The acrylic artificial stone composition as claimed in claim 1, wherein the composition includes:

about 0.1 to 5 parts by weight of the metallized polymer film particles, based on 100 parts by weight of the acrylic resin, and about 100 to 200 parts by weight of the inorganic filler, based on 100 parts by weight of the acrylic resin.

3. The acrylic artificial stone composition as claimed in claim 1, wherein a thickness of the polymer film is about 30 μm to about 100 μm.

4. The acrylic artificial stone composition as claimed in claim 1, wherein a total thickness of the one or more metal layers is about 1 μm to about 10 μm.

5. The acrylic artificial stone composition as claimed in claim 1, wherein the acrylic resin includes:

a weight fraction of greater than or equal to about 65% of one or more (meth)acrylic acid compounds, and a weight fraction of less than or equal to about 35% of one or more polyacrylates.

6. The acrylic artificial stone composition as claimed in claim 5, wherein the one or more (meth)acrylic acid compounds include one or more of methacrylic acid, methyl methacrylate, ethyl methacrylate, isopropyl methacrylate, n-butyl methacrylate and/or 2-ethylhexyl methacrylate.

7. The acrylic artificial stone composition as claimed in claim 1, further comprising artificial and/or genuine stone chips having a particle size of about 0.1 mm to about 5 mm.

8. The acrylic artificial stone composition as claimed in claim 1, wherein the metallized polymer film particles each have a layered structure including the polymer film and two or more metal layers sequentially stacked.

9. An acrylic artificial stone article, comprising:

a polymeric acrylic matrix;

metallized polymer film particles embedded in the polymeric acrylic matrix, the metallized polymer film particles including one or more metal layers on a surface of a polymer film and having a particle size of about 0.001 to about 2.5 mm; and an inorganic filler embedded in the polymeric acrylic matrix.

10. The acrylic artificial stone article as claimed in claim 9, wherein the article includes:

about 0.1 to 5 parts by weight of the metallized polymer film particles, based on 100 parts by weight of the polymeric acrylic matrix, and about 100 to 200 parts by weight of the inorganic filler, based on 100 parts by weight of the polymeric acrylic matrix.

11. The acrylic artificial stone article as claimed in claim 9, wherein a thickness of the polymer film is about 30 μm to about 100 μm.

12. The acrylic artificial stone article as claimed in claim 9, wherein a total thickness of the one or more metal layers is about 1 μm to about 10 μm.

13. The acrylic artificial stone article as claimed in claim 9, wherein the polymeric acrylic matrix includes:

a weight fraction of greater than or equal to about 65% of one or more acrylic acid compounds, and a weight fraction of less than or equal to about 35% of one or more polyacrylates.

14. The acrylic artificial stone article as claimed in claim 13, wherein the one or more (meth)acrylic acid compounds include one or more of methacrylic acid, methyl methacrylate, ethyl methacrylate, isopropyl methacrylate, n-butyl methacrylate and/or 2-ethylhexyl methacrylate.

15. The acrylic artificial stone article as claimed in claim 9, further comprising artificial and/or genuine stone chips having a particle size of about 0.1 mm to about 5 mm.

16. The acrylic artificial stone article as claimed in claim 9, wherein the metallized polymer film particles each have a layered structure including the polymer film and two or more metal layers sequentially stacked.

17. A method of preparing an artificial stone, comprising:

providing an acrylic resin, metallized polymer film particles, and an inorganic filler; and combining the acrylic resin, metallized polymer film particles, and the inorganic filler to form a composition, wherein the metallized polymer film particles include one or more metal layers on a surface of a polymer film and have a particle size of about 0.001 to about 2.5 mm.

18. The method of preparing an artificial stone as claimed in claim 17, further comprising:

forming the composition into a predetermined shape; and curing the composition to form a solid surface article.

19. The method of preparing an artificial stone as claimed in claim 17, wherein a total thickness of the one or more metal layers is about 1 μm to about 10 μm.

20. An acrylic artificial stone article, comprising:

a polymeric acrylic matrix;

particles of polymer film embedded in the polymeric acrylic matrix, a thickness of the polymer film being about 30 μm to about 100 μm, the polymer film being coated with one or more metal layers having a total thickness of about 1 μm to about 10 μm; and an inorganic filler embedded in the polymeric acrylic matrix.

21. An acrylic artificial stone article, comprising:

a polymeric acrylic matrix;

particles of polymer film embedded in the polymeric acrylic matrix, the polymer film being coated with one or more metal layers;

an inorganic filler embedded in the polymeric acrylic matrix; and artificial and/or genuine stone chips embedded in the polymeric acrylic matrix.

* * * * *